United States Patent
Rovan et al.

(10) Patent No.: US 8,956,489 B2
(45) Date of Patent: Feb. 17, 2015

(54) PROCESS FOR PRODUCING A SHELL-SHAPED HOLLOW BODY AND A USE THEREFOR

(71) Applicant: MAGNA STEYR Fahrzeugtechnik AG & Co. KG, Graz (AT)

(72) Inventors: Julia Rovan, Graz (AT); Manuel Erlacher, Radenthein (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 13/624,982

(22) Filed: Sep. 24, 2012

(65) Prior Publication Data

US 2013/0014885 A1 Jan. 17, 2013

(30) Foreign Application Priority Data

Sep. 24, 2011 (DE) .......................... 10 2011 114 389

(51) Int. Cl.
| | |
|---|---|
| *B29C 69/00* | (2006.01) |
| *B29C 70/32* | (2006.01) |
| *B29C 70/86* | (2006.01) |
| *B29C 70/08* | (2006.01) |
| *B29L 31/30* | (2006.01) |
| *B29C 49/00* | (2006.01) |

(52) U.S. Cl.
CPC ................. *B29C 70/32* (2013.01); *B29C 70/86* (2013.01); *B29C 70/086* (2013.01); *B29L 2031/3002* (2013.01); *B29C 49/00* (2013.01)
USPC ............ 156/193; 156/187; 156/189; 156/191

(58) Field of Classification Search
USPC ......... 156/173, 174, 180, 189, 190, 191, 193, 156/194, 264, 187
See application file for complete search history.

(56) References Cited

U.S. PATENT DOCUMENTS

| | | | | |
|---|---|---|---|---|
| 2,464,116 | A | * | 3/1949 | Christiansen .................. 114/291 |
| 3,031,943 | A | * | 5/1962 | Steiner ............................. 454/78 |
| 3,514,053 | A | * | 5/1970 | McGuinness ................. 244/12.2 |
| 3,704,027 | A | * | 11/1972 | Laudadio ................... 280/5.509 |
| 3,984,271 | A | * | 10/1976 | Gilbu ............................. 156/174 |
| 4,118,814 | A | * | 10/1978 | Holtom ......................... 114/357 |
| 4,352,769 | A | * | 10/1982 | Meyer ........................... 264/134 |
| 4,401,495 | A | * | 8/1983 | McKinney .................... 156/173 |
| 5,435,868 | A | * | 7/1995 | Yu et al. ........................ 156/175 |
| 6,113,826 | A | * | 9/2000 | Tajima et al. ................. 264/159 |
| 2002/0166595 | A1 | * | 11/2002 | Lindsay ........................ 138/153 |
| 2009/0014114 | A1 | * | 1/2009 | Yeh et al. ...................... 156/172 |

* cited by examiner

*Primary Examiner* — William Bell
(74) *Attorney, Agent, or Firm* — Jordan IP Law, LLC; Todd A. Vaughn

(57) ABSTRACT

A process for producing a shell-shaped hollow body composed of fiber-reinforced plastic in which, in a first step, a continuous hollow body made of fiber-reinforced plastic is produced. In a second step, the continuous hollow body is separated into a plurality of shell-shaped hollow bodies. Such a shell-shaped hollow body is applicable in vehicle construction, for example, as chassis or bodywork.

14 Claims, 3 Drawing Sheets

PROCESS FOR PRODUCING A SHELL-SHAPED HOLLOW BODY AND A USE THEREFOR

CROSS-REFERENCE TO RELATED APPLICATIONS

The present application claims priority under 35 U.S.C. §119 to German Patent Application No. DE 10 2011 114 389.4 (filed on Sep. 24, 2011), which is hereby incorporated by reference in its entirety.

FIELD OF THE INVENTION

Embodiments of the invention relate to a process for producing a shell-shaped hollow body made of fibre-reinforced material such as plastic, a method of using such a hollow body, and to a process for producing a vehicle which employs the process for producing such a shell-shaped hollow body.

BACKGROUND OF THE INVENTION

The production of a fibre-composite hollow body, in particular of a hollow fibre-composite component for a motor vehicle, has been disclosed in principle in WO 2009/68127 A1. Here, continuous reinforcement fibres are applied to a sacrificial mould corresponding to the subsequent cavity and are impregnated with a curable resin. The resin applied is then hardened, and the sacrificial mould is removed from the finished component.

Moreover, German Patent Publication No. DE 31 06 273 A1 discloses a tubular body made of hybrid-fibre-reinforced plastic, whereby strips made of parallel fibre strands are applied to a round former and are saturated with synthetic resin.

Although, therefore, processes for producing fibre-reinforced plastics components are known in principle, there is nevertheless a lack of a process for the efficient production of shell-shaped hollow bodies.

SUMMARY OF THE INVENTION

It is, therefore, an object of the invention to provide an enhanced process for producing a shell-shaped hollow body made of fibre-reinforced material such as plastic, a method of using such a hollow body, and to a process for producing a vehicle which employs the process for producing such a shell-shaped hollow body. Such a process and method is advantageous for providing an efficient production of this type of hollow body with greater quality than that of hollow bodies produced by known processes.

The object of the invention, as well as others, is achieved via a process producing a shell-shaped hollow body made of fibre-reinforced material such as plastic, the process including at least one of the following: producing a continuous hollow body made of fibre-reinforced plastic, and then separating the continuous hollow body into a plurality (e.g., two, four or eight) shell-shaped hollow bodies.

It is advantageous that half-shell-shaped hollow bodies can be produced very efficiently in this way. A continuous hollow body is generally easier to produce than a shell-shaped hollow body, since there is no need for any special method for laying-up the fibres in the region of the aperture of the shell-shaped hollow body. Instead, when the continuous hollow body is produced, unlike when the half-shell-shaped hollow bodies are manufactured individually, the fibres are laid up across the subsequent separation area. For this reason, the orientation of the fibres in the shell-shaped hollow body is also particularly homogeneous.

Another advantage is that the process for producing a continuous hollow body simultaneously produces a plurality of shell-shaped hollow bodies, thus additionally increasing productivity.

A further advantage is that practically no off-cut arises during separation of the continuous hollow body, whereas material is always lost during trimming of a shell-shaped hollow body produced by a conventional process.

By way of example, the fibre-reinforced hollow bodies in accordance with embodiments of the invention can be produced with the aid of "rovings" and/or "prepregs" and with use of an "autoclave." As used here, "rovings" are bundles of untwisted, drawn fibres which are used in the manufacture of fibre-composite materials and especially of fibre-plastics composites. Rovings can be processed by machinery and can therefore be used in automated processes. As used here, "prepregs" are preimpregnated fibres which are composed of fibres and of an uncured thermoset plastics matrix. Prepregs can be processed by machinery and can therefore be used in automated processes. As used here, an "autoclave" is a pressure vessel which can be sealed so as to be gas-tight and which is intended for the production of fibre-plastics-composite materials. Pressures of up to 10 bar and temperatures of up to 400° C. are usually generated in these autoclaves, in order to subject the individual layers of laminate to a pressing process. Prepregs are often used as semifinished fibre products.

This object, as well as others is also achieved via a method of using, in vehicle construction, a shell-shaped hollow body produced in accordance with embodiments of the invention. It is preferable that the shell-shaped hollow body is used as chassis, as bodywork, as passenger compartment and/or for parts of the same.

The method in accordance with embodiments is additionally advantageous in producing motor vehicles at particularly low cost and high quality. The advantage is particularly clear in this application by virtue of the stringent quality and production-costs requirements in motor vehicle construction.

In accordance with embodiments, a process for producing a vehicle includes at least one of: the process steps mentioned for producing a shell-shaped hollow body, where the continuous hollow body made of fibre-reinforced plastic is separated in the second step into two half-shell-shaped hollow bodies, where each of the two half-shell-shaped hollow bodies is installed, in a third step, as chassis, as bodywork and/or as passenger compartment of a vehicle.

In accordance with embodiments, a process for producing a hollow body having a shell cross-section includes at least one of: producing a continuous hollow body composed of fibre-reinforced plastic; and then separating the continuous hollow body into a plurality of hollow bodies having a shell cross-section.

In accordance with embodiments, a process for producing a vehicle includes at least one of: producing a continuous hollow body composed of fibre-reinforced plastic; separating the continuous hollow body into a plurality of hollow bodies having a shell cross-section; and then installing the hollow bodies as a portion of the vehicle.

In accordance with embodiments, a process for producing a motor vehicle includes at least one of: producing a hollow body composed of fibre-reinforced plastic; separating the hollow body into a plurality of hollow bodies having a predetermined cross-section; and then installing the hollow bodies as a portion of the vehicle.

A particular possibility in a process in accordance with embodiments of the invention for producing a motor vehicle is that the half-shell-shaped hollow bodies are respectively installed as lower shell of a vehicle, where a transparent dome, preferably made of a material such as Plexiglas®, is placed onto the lower shell. This can provide particularly efficient and low-cost production of vehicles with half-shells made of fibre-reinforced plastic.

Other advantageous embodiments of the invention can now be found in the dependent claims, and also in the description in conjunction with the figures.

In an advantageous embodiment, in the first step, a fibre strand and/or woven fibre fabrics, braided fibre fabrics, knitted fibre fabrics or non-woven fibre fabrics are wound around a hollow male mould. Use of the hollow male mould, where this can remain within the finished workpiece, can provide a further simplification of the production of shell-shaped hollow bodies. In an advantageous embodiment, the male mould is composed of thin-walled plastic which is in particular thermoplastic. In this variant, the male core can be produced at particularly low cost. In particular, the male core can have fibre-reinforcement.

In a particularly advantageous embodiment, the winding process takes place in a winding machine. This method permits automation of the production of shell-shaped hollow bodies, and thus permits even more efficient production in accordance with even more stringent quality criteria. The use of a winding machine for producing shell-shaped hollow bodies becomes possible only because these are produced by the route involving a continuous hollow body.

The advantages provided in accordance with the invention, is therefore, particularly clear at this point, and in this context the invention can also be seen as recognizing that the production of shell-shaped hollow bodies by the route involving a continuous hollow body permits the use of a winding machine.

In an advantageous embodiment, the fibre-reinforced plastic comprise at least one of glass fibres, Kevlar® fibres, aramid fibres, carbon fibres, vegetable fibres, rock fibres, fibres made of thermoplastic or any mixture or combination thereof. It is thus possible to achieve successful adjustment of the properties of the shell-shaped hollow body so that they are appropriate for the requirements placed thereupon.

In an advantageous embodiment in this context, a male mould is produced by the rotomoulding process. "Rotomoulding" or a "rotomoulding process" is a process for producing hollow bodies in which a melt, which is often composed of a molten thermoplastic, solidifies on the walls of a rotating mould.

In another advantageous embodiment, a male mould is produced by the blowing process. "Blow moulding" or a "blowing process" is a process for producing hollow bodies from thermoplastics. In this process, a tube made of hot, mouldable plastic is extruded as parison and is forced onto the inner surfaces of a mould by injecting compressed air.

The above embodiments of the invention can be combined in any desired manner.

BRIEF DESCRIPTION OF THE DRAWINGS

Advantageous refinements of the invention will emerge from the dependent claims. Exemplary embodiments of the invention will be discussed in principle below on the basis of the drawing, in which:

DETAILED DESCRIPTION OF EMBODIMENTS

Figure 1:
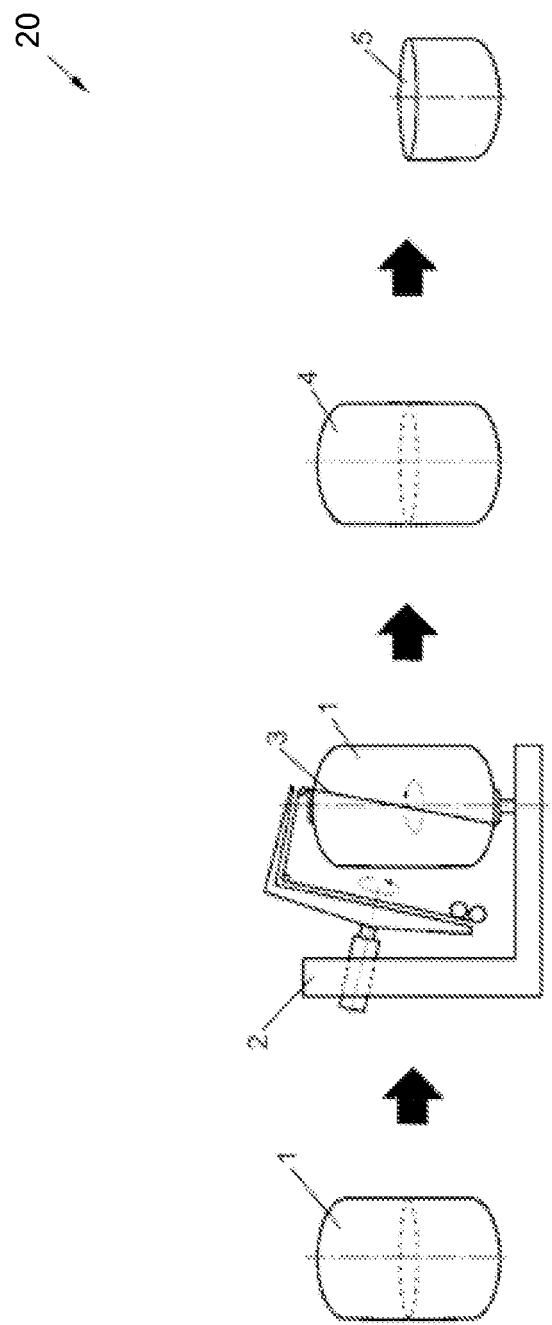
FIG. 1 illustrates steps for producing a shell-shaped hollow body in accordance with an embodiment of the invention.

FIG. 1 illustrates steps of an example of a production process 20 for producing a half-shell-shaped hollow body 5 made of fibre-reinforced plastic. In a first step, a continuous hollow body made of fibre-reinforced plastic 4 is produced. In a second step, the continuous hollow body is separated into a plurality of half-shell-shaped hollow bodies 5.

In accordance with an embodiment of the invention, the continuous hollow body 4 is produced by a negative process. For instance, a male mould 1 is provided (left-hand image), and is clamped into a winding machine 2. A fibre strand 3 is then wound around the male mould 1 (second image from left-hand side). The fibre strand 3 can be unimpregnated (roving) or can have been impregnated with a plastic matrix (prepreg). The fibre strand 3 can also include fibres composed of thermoplastic. Alternatively, or additionally, the male mould 1 can also be covered with braided fibre fabrics, with woven fibre fabrics, with knitted fibre fabrics or with non-woven fibre fabrics. The fibres can, by way of example, be composed of at least one of glass fibres, Kevlar® fibres, aramid fibres, carbon fibres, vegetable fibres, rock fibres, fibres made of thermoplastic and any mixture or combination thereof. The male mould 1 itself can be composed of thin-walled plastic which is in particular thermoplastic, and by way of example, can have been produced by the rotomoulding process or blowing process.

After the winding process, the continuous hollow body 4 is finished by impregnation with resin (if rovings are used), or is directly hardened in the autoclave (if prepregs or thermoplastic fibres are used). The third image from the left-hand side of FIG. 1 illustrates the resultant hollow body.

In a further step, the continuous hollow body 4 is separated into a plurality (specifically here into two) half-shell-shaped hollow bodies 5 (right-hand image). It is advantageous that half-shell-shaped hollow bodes 5 can be produced very efficiently by this method, since the winding around the male mould 1 can take place as illustrated in a winding machine 2 and can thus be automated. The orientation of the fibres in the hollow body 5 is moreover very homogeneous, since when the continuous hollow body 4 is produced, unlike when the half-shell-shaped hollow bodies 5 are manufactured individually, the fibres are laid up across the subsequent separation area.

Figure 2:
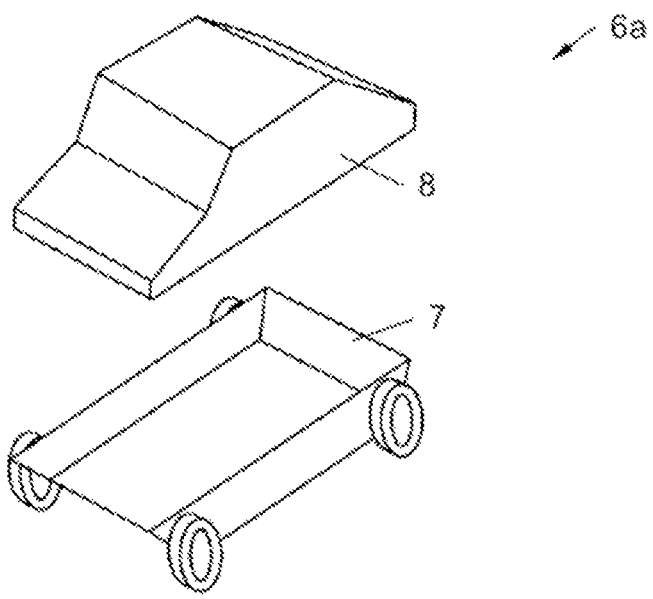
FIG. 2 illustrates a use of the shell-shaped hollow bodies in motor-vehicle construction.

As illustrated in FIG. 2, the resultant half-shell-shaped hollow body 5 formed can have specific applicability in motor vehicle construction. For instance, a half-shell-shaped hollow body is used as chassis 7 and another half-shell-shaped hollow body is used as bodywork 8 of a motor vehicle 6a.

Figure 3:
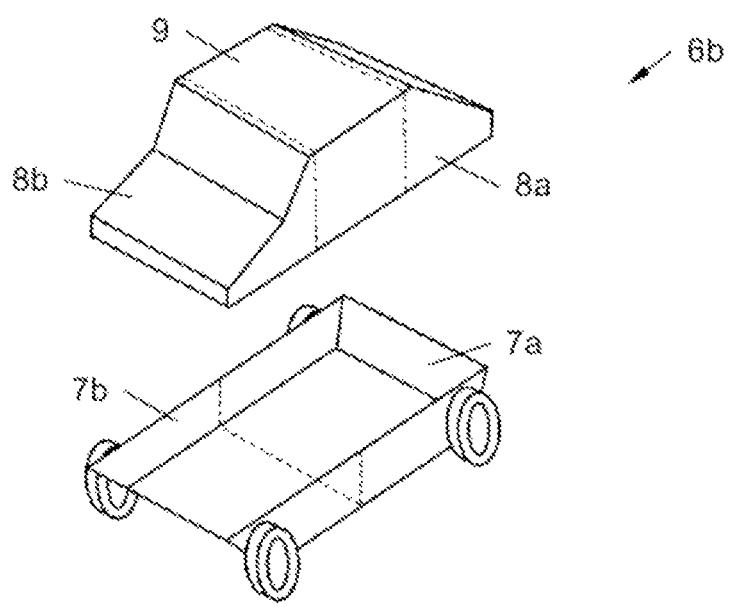
FIG. 3 illustrates another use of the shell-shaped hollow bodies in motor-vehicle construction.

As illustrated in FIG. 3, a motor vehicle 6b has the same shape as the motor vehicle 6a illustrated in FIG. 2. In this case, however, the chassis is composed of two shell-shaped hollow bodies 7a, 7b which have been cut as described above from continuous hollow bodies. Unlike in the examples described herein, each continuous hollow body here is divided into four parts, and four parts 7a are, therefore, cut from a first continuous hollow body, and four parts 7b are therefore cut from a second continuous hollow body. This procedure is advantageous by way of example when the orientation of the fibres in the first part 7a is intended to be different from that in the second part 7b. The shell-shaped hollow bodies 8a, 8b which form a part of the bodywork of the motor vehicle 6b have been produced in the same way. The only part not cut from an originally continuous hollow body is the central part 9.

Figure 4:
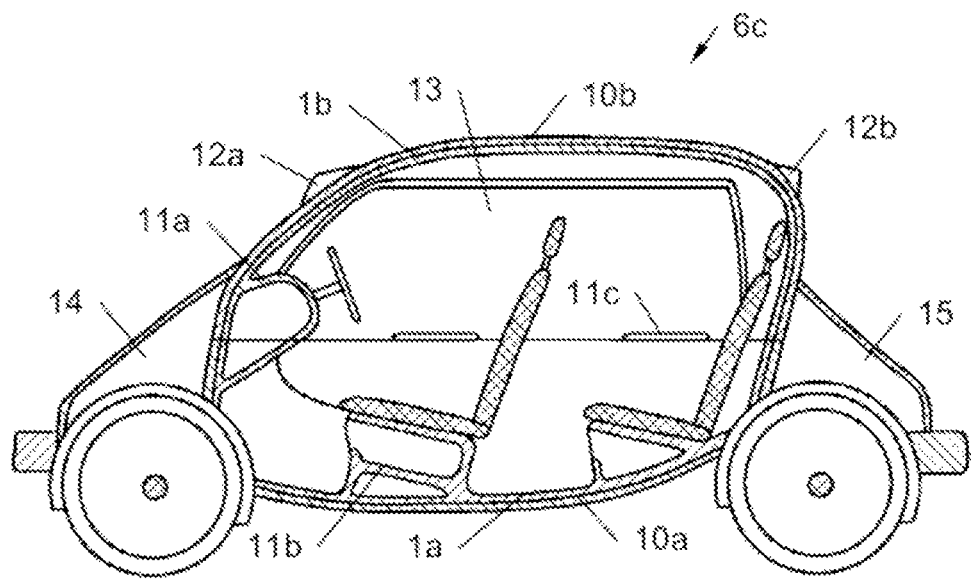
FIG. 4 illustrates a section through another embodiment of a motor vehicle in accordance with an embodiment of the invention.

As illustrated in FIG. 4 illustrates a section through another vehicle 6c which includes a passenger compartment which has a lower part and an upper part. The lower part includes a male mould 1a which, by way of example, as illustrated in FIG. 1 has been sheathed with an external sheath 10a made of fibre-reinforced plastic. By analogy, the upper part includes a male mould 1b which by way of example as illustrated in FIG. 1 has been sheathed with an external sheath 10b made of fibre-reinforced plastic.

In this example, the male moulds 1a, 1b includes on the inner side functional components, specifically a dashboard 11a, a retainer 11b for a seat, and armrests 11c. In an advantageous embodiment, a passenger compartment can be produced particularly efficiently by this method. It is also possible, however, to incorporate functional components subsequently into the passenger compartment. In particular, other possibilities are mixed embodiments involving functional components 11a, 11c integrated within the male mould 1a, 1b and functional components incorporated subsequently.

Advantageously, the male moulds 1a, 1b have, as in the present example, an exterior surface that is in essence continuous thus permitting easy encapsulation thereof into a fibre-reinforced plastic. Relatively small apertures, however, can be bridged without difficulty.

In the present example, the passenger compartment has been designed without windows and comprises external cameras 12a, 12b provided for transmitting an image of the environment of the passenger compartment 1a to one or more display screens 13 arranged in the interior of the passenger compartment. The passenger compartment, is therefore, particularly rigid, and the egg shape thereof is also of particular assistance in this respect and has particular stability along its longitudinal axis, permitting particularly successful dissipation of forces arising in the event of collisions.

Add-on parts 14 and 15 have been mounted onto the passenger compartment, and includes parts of the chassis and also of the drive system. Advantageously, the add-on parts 14 and 15 do not interrupt the passenger compartment, and the protective function of the passenger compartment, is therefore, retained.

Figure 5:
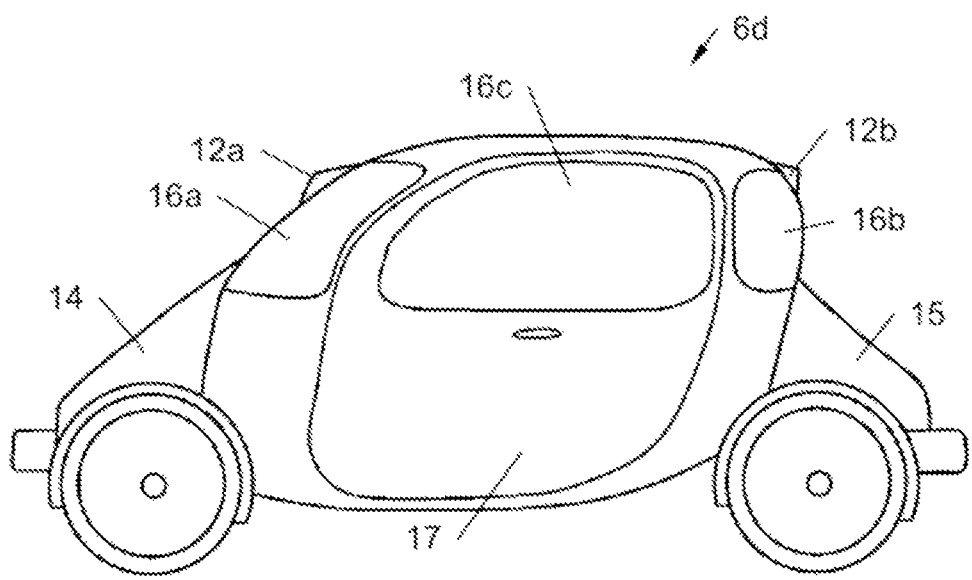
FIG. 5 illustrates a side view of yet another embodiment of a motor vehicle in accordance with an embodiment of the invention.

As illustrated in FIG. 5, a vehicle 6d which similar to the vehicle 6c illustrated in FIG. 4. A difference here, however, is that the passenger compartment of the vehicle 6d includes windows 16a, 160b, 16c. The cameras 12a, 12b and display screens can therefore be omitted, but are still retained in this embodiment, to provide additional safety. By way of example, the cameras 12a, 12b could register the environment in the infrared region or could be particularly light-sensitive in order to improve night visibility. FIG. 5 also illustrates an entry door 17.

By way of example, the door 17 and/or other aperture-closing parts can be separated from the finished passenger compartment and subsequently connected moveably to the passenger compartment. The separation here can be achieved, by way of example, with the aid of a milling cutter, a laser-cutting process or a water-jet-cutting process.

Unlike in the example illustrated, the plane of separation between the two halves of the passenger compartment can also run vertically, in such a way that the passenger compartment is produced from a left-hand half and from a right-hand half. The passenger compartment can also, of course, be composed of more parts, for example, four parts.

The examples revealed, of course, are intended only to illustrate the invention, and are only a selection of the many possibilities. The exterior shape of a motor vehicle 6a, 6b will, of course, in practice be more rounded than has been illustrated for reasons of simplicity in the figures. The external skin of the motor vehicle can even be egg-shaped or have the shape of an ellipsoid. Another possibility is moreover that cut-outs are prepared in the chassis 7 . . . 7b and/or in the bodywork 8 . . . 8b, 9, for example to receive vehicle glazing. It is naturally also conceivable that the shell-shaped hollow bodies are used elsewhere in the construction of an automobile, for example as cladding or the like. It is also possible to cut, from a continuous hollow body, not only two or four shell-shaped hollow bodies, but also more, in particular eight. This method is particularly efficient for the production process, since eight shell-shaped hollow bodies can be produced simultaneously with one winding procedure on a continuous hollow body.

It should be noted that the constituents of the figures have not always been illustrated to scale, and that the individual variants illustrated in the figures can also form the subject matter of an independent invention. Positional information such as "right-hand side," "left-hand side," "above" and "below" and the like relate to the position illustrated for the respective component and require appropriate conceptual adjustment when the position mentioned changes.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A process for producing an automobile, comprising:
producing a continuous hollow body composed of fibre-reinforced plastic; and then
finishing the continuous hollow body by impregnating the continuous hollow body with resin or directly hardening the continuous hollow body; and then
simultaneously separating the continuous hollow body into a plurality of hollow bodies having a shell cross-section, the plurality of hollow bodies including a first hollow body comprising a chassis, a second hollow body comprising a motor vehicle body, and a third hollow body comprising a passenger compartment,
wherein the orientation of fibres in the chassis are the same as the orientation of fibres in the motor vehicle body.

2. The process of claim 1, wherein producing the continuous hollow body comprises winding at least one of a fibre strand, woven fibre fabrics, braided fibre fabrics, knitted fibre fabrics and non-woven fibre fabrics around a hollow male mould.

3. The process of claim 2, wherein the winding occurs using a winding machine.

4. The process of claim 2, wherein the male mould is composed of a thermoplastic material.

5. The process of claim 4, wherein the male mould is produced by a rotomoulding process.

6. The process of claim 4, wherein the male mould is produced by a blowing process.

7. The process of claim 1, wherein the fibre-reinforced plastic comprises at least one of glass fibres, para-aramid fibres, aramid fibres, carbon fibres, vegetable fibres, rock fibres, thermoplastic fibres and mixtures thereof.

8. A process for producing an automobile, the process comprising:
 producing a continuous hollow body composed of fibre-reinforced plastic with fibres having a homogenous orientation;
 simultaneously separating the continuous hollow body into a plurality of hollow bodies having a shell cross-section, wherein the plurality of hollow bodies includes a first hollow body comprising a first chassis part, a second hollow body comprising a second chassis part, a third hollow body comprising a first motor vehicle body part, and a fourth hollow body comprising a second motor vehicle body part,
 wherein the orientation of the fibres of the first chassis part are different than the orientation of fibres in the second chassis part; and then
 installing the hollow bodies as a portion of the motor vehicle.

9. The process of claim 8, further comprising installing a transparent dome made of a thermoplastic material on one of the hollow bodies.

10. The process of claim 8, wherein the hollow bodies are installed as a passenger compartment of a vehicle.

11. A process for producing an automobile, comprising:
 providing a male mould having an external sheath composed of fibre-reinforced plastic;
 separating the male mould into a first male mould section to produce a lower part of a passenger compartment, and a second male mould section to produce an upper part of the passenger compartment,
 wherein the first male mould section and the second male mould section includes functional components of the automobile which are integrated on inner sides of the first male mould section and the second male mould section, respectively.

12. The process of claim 11, wherein the functional components comprise a dashboard, a retainer for a seat, and armrests.

13. The process of claim 11, further comprising providing on the passenger compartment external cameras.

14. The process of claim 13, wherein the external cameras are configured to transmit an image of an environment of the passenger compartment to one or more display screens arranged in an interior of the passenger compartment.

* * * * *